United States Patent
Bhalla et al.

(10) Patent No.: US 10,621,618 B2
(45) Date of Patent: Apr. 14, 2020

(54) SYSTEM AND METHOD TO CONNECT A USER OF A PRODUCT TO CONTACTS OF THE USER WHO ARE PROMOTERS

(71) Applicants: Kapil Bhalla, New Delhi (IN); Manohar Mahapatra, Bhubaneswar (IN); Santosh Katta, Bhubaneswar (IN)

(72) Inventors: Kapil Bhalla, New Delhi (IN); Manohar Mahapatra, Bhubaneswar (IN); Santosh Katta, Bhubaneswar (IN)

(73) Assignee: Intuit Inc., Mountain View, CA (US)

( * ) Notice: Subject to any disclaimer, the term of this patent is extended or adjusted under 35 U.S.C. 154(b) by 1014 days.

(21) Appl. No.: 14/626,318

(22) Filed: Feb. 19, 2015

(65) Prior Publication Data

US 2016/0247191 A1 Aug. 25, 2016

(51) Int. Cl.
| | |
|---|---|
| *G06Q 30/02* | (2012.01) |
| *H04L 29/08* | (2006.01) |
| *G06F 8/60* | (2018.01) |
| *G06F 8/71* | (2018.01) |
| *G06F 9/00* | (2006.01) |
| *G06F 8/00* | (2018.01) |

(52) U.S. Cl.
CPC ........... *G06Q 30/0255* (2013.01); *G06F 8/00* (2013.01); *G06F 8/60* (2013.01); *G06F 8/71* (2013.01); *G06F 9/00* (2013.01); *G06Q 30/0269* (2013.01); *H04L 67/22* (2013.01)

(58) Field of Classification Search
CPC ........... G06Q 30/0255; G06Q 30/0257; G06Q 30/0258
See application file for complete search history.

(56) References Cited

U.S. PATENT DOCUMENTS

| | | | |
|---|---|---|---|
| 8,538,811 B2* | 9/2013 | Higgins | G06Q 30/02 705/14.2 |
| 2010/0317322 A1* | 12/2010 | Underwood | G06Q 10/10 455/410 |
| 2012/0158516 A1* | 6/2012 | Wooten, III | G06Q 30/0269 705/14.66 |
| 2014/0067557 A1* | 3/2014 | van Niekerk | G06Q 30/0623 705/14.73 |

* cited by examiner

*Primary Examiner* — Arthur Duran
*Assistant Examiner* — Derek Jessen
(74) *Attorney, Agent, or Firm* — Ferguson Braswell Fraser Kubasta PC

(57) ABSTRACT

A method for connecting users of a software application, including registering a first version of the software application. The method further includes transmitting, to a matching server, a contact list including personally identifiable information of users of the software application. The method further includes receiving, from the matching server, a promoter contact selected, according to a promotion criterion, from the users of the software application in the contact list. The method further includes displaying the promoter contact.

12 Claims, 6 Drawing Sheets

US 10,621,618 B2

SYSTEM AND METHOD TO CONNECT A USER OF A PRODUCT TO CONTACTS OF THE USER WHO ARE PROMOTERS

BACKGROUND

Software applications include multiple versions, some of which include functionality not present in other versions. First time users of software applications choose among those multiple versions, and may select a feature-limited, ad-supported, or time-limited trial version of the software application to test out the software application. After using the trial version, the user may want to modify the software application to a feature-enhanced, ad-free, or unlimited version of the software application after the trial.

SUMMARY

In general, in one aspect, embodiments of the invention relate to a method for connecting users of a software application, including registering a first version of the software application. The method further includes transmitting, to a matching server, a contact list including personally identifiable information of users of the software application. The method further includes receiving, from the matching server, a promoter contact selected, according to a promotion criterion, from the users of the software application in the contact list. The method further includes displaying the promoter contact.

In general, in one aspect, embodiments of the invention relate to a method for connecting users of a software application, including receiving a registration for the software application and receiving a contact list from a user device. The method further includes matching the contact list to product users of the software application to obtain product user contacts. The method further includes selecting a promoter contact from the product user contacts based on a promotion criterion and transmitting the promoter contact to the user device.

In general, in one aspect, embodiments of the invention relate to a system for connecting users of a software application. The system includes a network and a matching server and a user device operatively connected to the matching server via the network. The user device includes a device processor configured to register a first version of the software application and transmit, to the matching server, a contact list including personally identifiable information of users of the software application. The device processor is further configured to receive, from the matching server, a promoter contact selected, according to a promotion criterion, from the users of the software application in the contact list. The device processor is further configured to display the promoter contact. The user device further includes a device storage storing the contact list.

In general, in one aspect, embodiments of the invention relate to a non-transitory computer readable medium comprising computer readable program code embodied therein for registering a first version of the software application, transmitting, to a matching server, a contact list including personally identifiable information of users of the software application, and receiving, from the matching server, a promoter contact selected, according to a promotion criterion, from the users of the software application in the contact list. The computer readable program code further for displaying the promoter contact.

Other aspects of the invention will be apparent from the following description and the appended claims.

DETAILED DESCRIPTION

Figure 1:
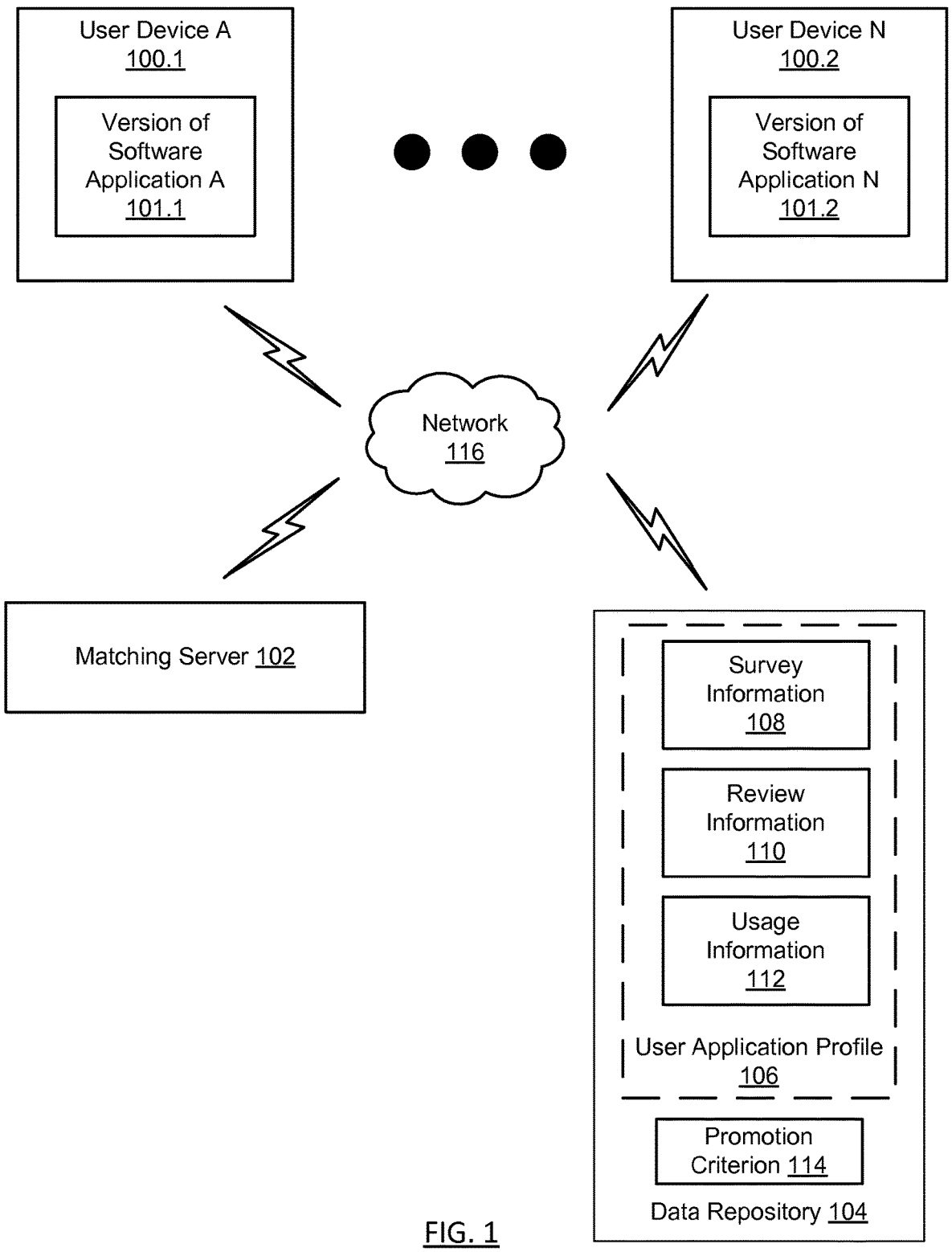
FIGS. 1 and 2 show schematic diagram systems in accordance with one or more embodiments of the invention.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to connecting users of a software application through a user's contact list. In particular, a first version of the software application may be registered for a user. The contact list of the user is transmitted to a matching server. The contact list includes personally identifiable information of at least one other user of the software application. According to a promotion criterion, a promoter contact who is listed in the contact list and is a user of the software application is selected. Thus, the user of the first version may be connected with the promoter contact.

FIG. 1 shows a diagram of a system in accordance with one or more embodiments. As shown in FIG. 1, the system may include one or more user devices (e.g., user device A (100.1), user device N (100.2)), a matching server (102), and a data repository (104) operatively connected by a wired or wireless network (116) (e.g., a local area network (LAN), a wide area network (WAN) such as the Internet, mobile network, any other type of network, or any combination thereof). In one or more embodiments, the data repository (104) may include promotion criterion (114) and a user application profile (106) (e.g., survey information (108), review information (110), and/or usage information (112)) for one or more software applications.

The user devices (e.g., user device A (100.1), user device N (100.2)), matching server (102), and data repository (104) may take the form of a specialized computer system. The user devices (e.g., user device A (100.1), user device N (100.2)), matching server (102), and data repository (104) may be implemented on the same or different specialized computer systems of the type found and described in relation to FIG. 6.

In one or more embodiments, a user device (e.g., user device A (100.1), user device N (100.2)) is a combination of hardware and software configured to execute one or more versions of a software application (e.g., version of software application A (101.1), version of software application N (101.2)). For example, a user device (e.g., user device A (100.1), user device N (100.2)) may be a mobile phone, a desktop computer, a laptop computer, a tablet, or any other device configured to operate as described herein. In one or more embodiments, a user device (e.g., user device A (100.1), user device N (100.2)) is configured to register a first version of the software application, and may transmit a contact list to a matching server and receive promoter contacts from the matching server, as discussed below. In one or more embodiments, a user device (e.g., user device A (100.1), user device N (100.2)) is configured to interact with the user to display the promoter contacts received from the matching server, and to allow the user to select one or more of the promoter contacts to send and receive messages from. A user device (e.g., user device A (100.1), user device N (100.2)) is described in greater detail in connection with FIG. 2, and the operation is described in greater detail in connection with FIGS. 3 and 4.

Although FIG. 1 shows the version of the software application as being on the user device, one or more of the versions of the software application may be in whole or in part remote from the user device in accordance with one or more embodiments of the invention. In such embodiments, a user device may be deemed to execute the version of the software application when the user device accesses the software application remotely, In one or more embodiments, a software application is a program or group of programs written in any programming language. Example software applications include a tax preparation application, a game, an email application, and a web browser. In one or more embodiments, the software application may have more than one version (e.g., version of software application A (101.1), version of software application N (101.2)). A version may be more limited and/or less suitable to a user in at least one aspect than another version.

By way of some examples, a first version of a software application may be a trial version, a feature-limited version, a lite version, an ad-sponsored version, a time-limited version, a version with a limited number of times the user is permitted to open, a version targeting a specific type of user, other type of version, or combination thereof. In the examples, a second version of a software application may be a full version, a feature-added version, an ad-free version, a version with time-limits removed, a version with an unlimited number of times the user is permitted to open, etc.

By way of another example of suitability, a first version may be an edition that is geared toward one class of users while a second version is an edition geared toward another class of users. As a more specific example, the first version may be a professional edition while the second version is a home edition. For a non-professional user using the software application for the user's personal use, the second version may be more suitable because the first version may use more complicated instructions that require users to have professional knowledge. Thus, even when the user starts with the first version, the second version although less expensive may more suitable for the user.

In some embodiments, one or more versions of the software application include instructions stored in any non-transitory computer readable medium which, when executed by one or more processors in a user device (as described below), enable the user device to perform the functions described in accordance with one or more embodiments of the invention. In one or more embodiments, a software application includes functionality to send messages to and receive messages from one or more contacts. In one or more embodiments, a software application includes survey functionality to ask a user's opinion related to a software application or a feature within the software application. For example, a software application may include a "Rate This Application" feature prompting a user to input a rating for the software application.

In one or more embodiments, the matching server (102) is a combination of hardware and software configured to connect one or more users of a software application. Further, the matching server (102) may include multiple different hardware units and/or devices. The multiple hardware units and/or devices may or may not be of the same type or located at the same physical site. In one or more embodiments, the matching server (102) is a specialized computer of the type described below in connection with FIG. 6. Further, the matching server (102) may be operatively connected to one or more user devices (e.g., user device A (100.1), user device N (100.2)) and one or more third party services containing some or all of survey information (108), review information (110), and usage information (112). In particular, the connection between the matching server may be direct, indirect, wired, wireless, or a combination thereof.

In one or more embodiments, the matching server (102) is configured to match a contact list received from a user device (e.g., user device A (100.1), user device N (100.2)) to obtain product user contacts for a software application. In one or more embodiments, a first user is a product user contact of a second user for a software application where the first user is in the contact list of the second user and where the matching server (102) has access to user application information (e.g., survey information (108), review information (110), or usage information (112)) for the first user for the software application.

In one or more embodiments, the matching server (102) is configured to communicate with one or more user devices (e.g., user device A (100.1), user device N (100.2)) to determine promoter contacts for a user for a software application based on a contact list received from the user, a promotion criterion (114), and a user application profile (106). In one or more embodiments, a first user is a promoter contact of a second user for a software application where the first user is in the contact list of the second user and where the first user is more likely than not to recommend the software application or features within the software application to the second user. Being in the contact list may indicate knowledge of the first user by the second user, such by being colleagues, acquaintances, and/or friends. The operation of a matching server (102) is described in greater detail in connection with FIGS. 3 and 4.

In one or more embodiments, the data repository (104) is any type of storage unit and/or device (e.g., a file system, database, collection of tables, or any other storage mechanism) for storing data. Further, the data repository (104) may include multiple different storage units and/or devices. The multiple different storage units and/or devices may or may not be of the same type, located at the same physical site, or maintained by the same entity (e.g., a first storage unit and/or device may be maintained in-house, while a second storage unit and/or device may be maintained by a third party).

In one or more embodiments, the data repository may include functionality to store a user application profile (106) and promotion criterion (114). In one or more embodiments, a user application profile (106) is information indicative of users' opinions of a particular software application. In other words, the user application profile (106) describes a user's relationship with the software application. A user application profile (106) may include one or more measures of user satisfaction, user engagement, or a combination thereof for one or more users of the software application.

In one or more embodiments, user satisfaction includes a measure of how happy a user is with the software application or with one or more features of the software application. In one or more embodiments, user satisfaction includes a measure of the likelihood that a user is to recommend the software application or one or more features of the software application to his or her friends and business associates. Such measure of user satisfaction with the user application may be expressed in terms of relative satisfaction (e.g., "highly satisfied," "slightly dissatisfied," "neutral," etc.), as a numerical score (e.g., on a scale of 1-10, with 10 being the most satisfied), or similar. The range and available ratings may vary between different embodiments of the invention.

In one or more embodiments, user engagement includes a measure of how interested a user is with the software application or with one or more features of the software application, and/or how a user uses the software application or one or more features of the software application. In one or more embodiments, user engagement includes a measure of the likelihood that a user is to recommend the software application or one or more features of the software application to his or her friends and business associates. Such measure of user engagement with the user application may be expressed in terms of relative engagement (e.g., "highly engaged," "slightly disengaged," "neutral," etc.), as a numerical score (e.g., on a scale of 1-10, with 10 being the most engaged), as a number of actions (e.g., the user has opened the software application 7 times), as a frequency of actions (e.g., the user opens the software application on average twice a day for the past two weeks), or similar. The possible values for measuring user engagement may vary between different embodiments of the invention.

The user application profile (106) may include survey information (108), review information (110), and/or usage information (112) related to a software application as described below. In one or more embodiments, all or part of the survey information, review information, and/or usage information may be submitted to, received from, and/or stored, temporarily or permanently, on a third-party, publicly accessible database, such as a store for software applications that includes functionality to receive reviews.

In one or more embodiments, survey information (108) is one or more data structures that may be used to store information about a user's opinion of a software application received from the user via survey functionality incorporated with the software application. Survey information (108) may be stored as a linked list, stack, queue, associative array, or any other format useful for storing information. Each field of the survey information (108) may be stored in data objects, numerical format, string format, or any other format useful for storing the information contained in that particular field. In one or more embodiments, the survey information (108) may be stored in such a way that it is searchable by the personally identifiable information of the user from whom the survey information (108) was received. For example, the survey information (108) for user X with email address Y may be retrieved by looking up the survey information (108) associated with email address Y.

In one or more embodiments, survey information (108) includes a measure of user satisfaction with the software application. For example, survey information (108) may include a user's rating of the usefulness of the software application. In one or more embodiments, survey information (108) includes a measure of user engagement with the software application. For example, survey information (108) may include a response indicating that a user is likely to use the software application at least once a day. In one or more embodiments, survey information (108) includes a measure of user satisfaction with one or more features within the software application. For example, survey information (108) may include a user's rating of the usefulness of a specific feature of the software application. In one or more embodiments, survey information (108) may include software-calculated data. For example, survey information (108) may include a measure of overall user satisfaction of the software application based on inputs by the user regarding specific features of the software application.

In one or more embodiments, review information (110) is one or more data structures that may be used to store information about a user's opinion of a software application received from the user via software application review functionality external to the software application. Review information (110) may be stored as a linked list, stack, queue, associative array, or any other format useful for storing information. Each field of the review information (110) may be stored in data objects, numerical format, string format, or any other format useful for storing the information contained in that particular field. In one or more embodiments, the review information (110) may be stored in such a way that it is searchable by the personally identifiable information of the user from whom the review information (110) was received. For example, the review information (110) for user X with phone number Z may be retrieved by looking up the review information (110) associated with phone number Z.

In one or more embodiments, review information (110) includes a measure of user satisfaction with the software application. For example, review information (110) may include a user's rating of the software application. In one or more embodiments, review information (110) includes a measure of user engagement with the software application. For example, review information (110) may include a response indicating that a user is likely to use the software application at least once a day. In one or more embodiments, review information (110) includes a measure of user satisfaction with one or more features within the software application. For example, review information (110) may include a user's rating of a specific feature of the software application. In one or more embodiments, review information (110) may include software-calculated data. For example, review information (110) may include an measure of overall user satisfaction of the software application based on inputs by the user regarding specific features of the software application. In one or more embodiments, the review information (110) may be submitted to and/or retrieved from a third-party, publicly accessible website or service.

In one or more embodiments, usage information (112) is one or more data structures that may be used to store information about a user's usage of a software application received from the user. Usage information (112) may be stored as a linked list, stack, queue, associative array, or any other format useful for storing information. Each field of the usage information (112) may be stored in data objects, numerical format, string format, or any other format useful for storing the information contained in that particular field. In one or more embodiments, the usage information (112) may be stored in such a way that it is searchable by the personally identifiable information of the user from whom the usage information (112) was received. For example, the usage information (112) for user X with device identifier Q may be retrieved by looking up the usage information (112) associated with device identifier Q.

In one or more embodiments, usage information (112) measures the interaction between a user and the software application. In other words, usage information stores metrics describing the user's use of the software application. For example, usage information (112) may include one or more statistics regarding usage of the software application, such as number of times that a user has logged into a software application over a period of time or a number of times that a user has recommended a software application. In one or more embodiments, usage information (112) includes a measure of usage of one or more features within the software application. For example, usage information (112) may include a number of times that a user has filed a tax return using the tax-related software application. Usage information may also include frequency information surrounding user selection of a specific interface element, type information surrounding transactions entered into by the user, etc.

In one or more embodiments, usage information (112) may also indicate a measure of user satisfaction with a software application or with one or more specific features within a software application. For example, usage information (112) indicating that a user has used a recommendation feature within a software application may indicate a high measure of user satisfaction with a software application. In one or more embodiments, usage information (112) may also indicate a measure of user engagement with a software application or with one or more specific features within a software application. For example, usage information (112) indicating that a user has logged into a software application more than five times may indicate a high measure of user engagement with a software application.

In one or more embodiments, the promotion criterion (114) is a minimal level of user satisfaction and/or user engagement indicating that a user is a promoter contact of an application (i.e., a user more likely than not to recommend an application and/or features within an application to other users). For example, a user with user application profile (106) information for a software application indicating a high level of user satisfaction with the software application and satisfying a promotion criterion (114) requiring that a user have at least a medium level of user satisfaction with the software application may be selected as a promoter contact of the software application. In a related example, a user with user application profile (106) information for a software application indicating a low level of user satisfaction and not satisfying the same promotion criterion (114) with a software application may not be selected as a promoter contact of the software application.

In one or more embodiments, promotion criterion (114) is one or more data structures that may be used to store information about a minimal level of user satisfaction and/or user engagement indicating that a user is a promoter contact of a software application (i.e., a user more likely than not to recommend a software application and/or features within a software application to other users). In one or more embodiments, a promotion criterion (114) is comparable to information in a user application profile (106) (e.g., survey information (108), review information (110), and/or usage information (112)) such that comparison between a promotion criterion (114) and information in a user application profile (106) (e.g., survey information (108), review information (110), and/or usage information (112)) for a user may determine if the user is a promoter contact of a software application.

In one or more embodiments, each software application has one or more promotion criterion (114) for users of that software application to be considered a promoter contact of the software application. For example, promotion criterion (114) for a software application may include a minimal score of 7 for survey information (108) from a user for the user to be selected as a promoter contact of the software application. In another example, promotion criterion (114) for a software application may include a minimal score of 4 stars or greater for review information (110) from a user for the user to be determined to be a promoter contact of the software application. In another example, promotion criterion (114) for a software application may include a minimal frequency of 15 application opens or greater for usage information (112) for a user for the user to be selected as a promoter contact of the software application.

In one or more embodiments, each software application may have more than one promotion criterion (114) for users of that software application to be considered a promoter contact of the software application. For example, promotion criterion (114) for a software application may include a minimal score of 4 stars or greater for review information (110) from a user and a minimal frequency of 15 application opens or greater for usage information (112) for the user to be determined to be a promoter contact of the software application.

In one or more embodiments, each software application has more than one promotion criterion (114) for users of that software application to be considered a promoter contact of the software application, and each promotion criterion (114) is accorded a different weight in the consideration. For example, promotion criterion (114) for a software application may include a minimal score of 4 stars or greater for review information (110) from a user and a minimal frequency of 15 application opens or greater for usage information (112) for the user to be determined to be a promoter contact of the software application. In this example, the review information (110) may be weighted more heavily, such that a review information (110) score higher than the minimal of 4 stars could make up for a usage information (112) lower than the minimal frequency of 15 application opens or greater. In this example, a user with review information (110) of 5 stars for the software application and usage information (112) of only 10 application opens may be determined to be a promoter contact.

In one or more embodiments, each software application has one or more mandatory promotion criteria (114) and one or more optional promotion criteria (114) for users of that software application to be considered a promoter contact of the software application. For example, promotion criterion (114) for a software application may include a minimal score of 4 stars or greater for review information (110) from a user for the user to be determined to be a promoter contact of the software application, and a minimal frequency of 15 application opens or greater for usage information (112) that is optional when the review information (110) from a user is 5 stars of greater, or mandatory when the review information (110) from a user is 4 stars or greater.

In one or more embodiments, the promotion criterion (114) may be entered by a user of the matching server (102). For example, a user of the matching server (102) may enter in the promotion criterion (114) via an input device (e.g., input device (610)) connected to the matching server, after which the promotion criterion (114) is transmitted to the data repository (104) for storage. In another embodiment, the promotion criterion (114) is entered by a user of a computer system (such as the computer system depicted in FIG. 6) operatively connected to the data repository (104) via the network (116).

Figure 2:
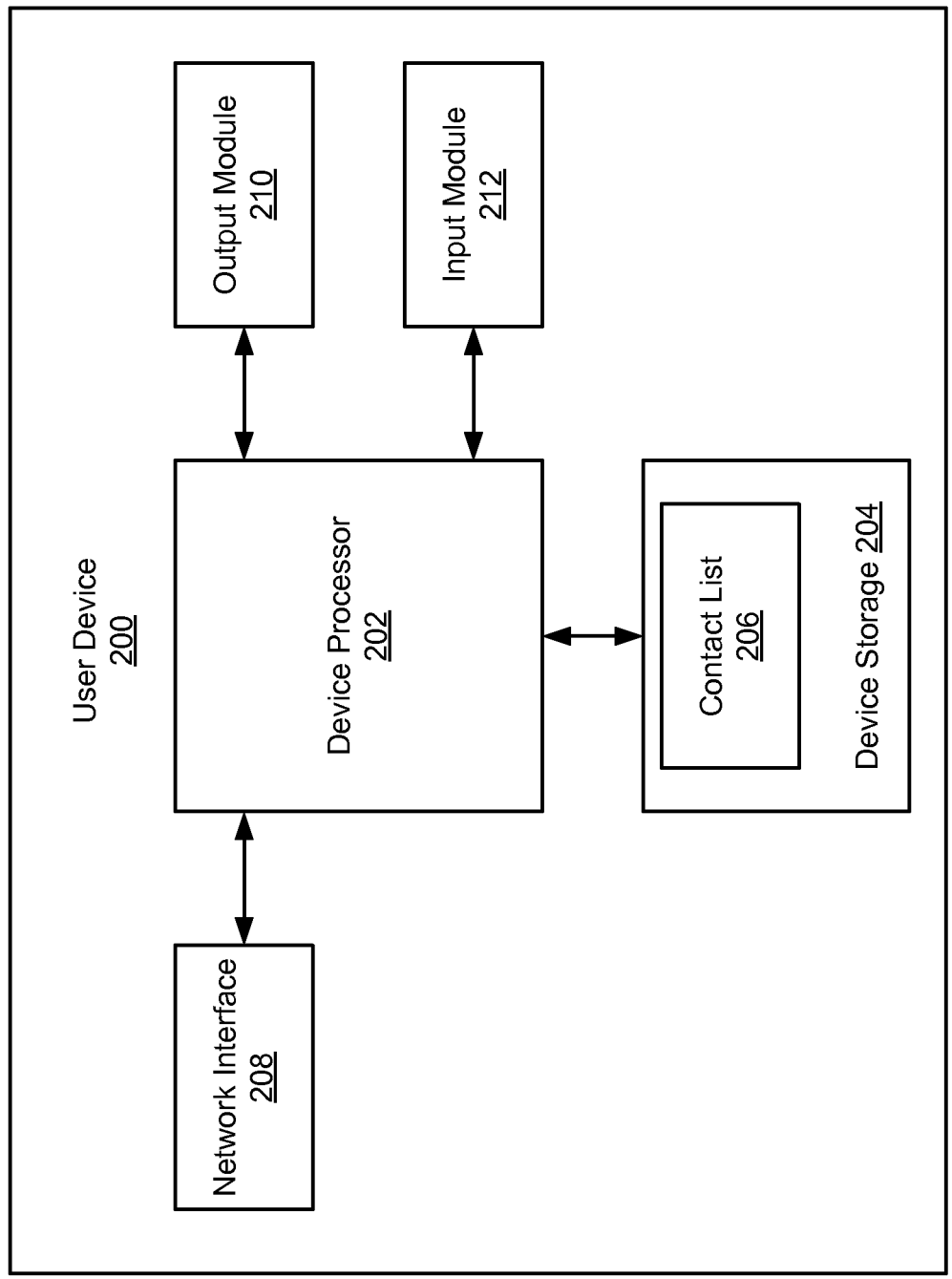

FIG. 2 shows a diagram of a user device (200) in accordance with one or more embodiments. In one or more embodiments, the user device (200) includes a device processor (202), device storage (204), contact list (206), network interface (208), output module (210), and input module (212). Each of these components is described further below. Further, in one or more embodiments, the components of the user device (200) (e.g., device processor (202), device storage (204), contact list (206), network interface (208), output module (210), and input module (212)) may be implemented in software, hardware, or some combination of hardware and software. Further, in one or more embodiments, two or more of the components of the user device (200) (e.g., device processor (202), device storage (204), contact list (206), network interface (208), output module (210), and input module (212)) may be combined into the same hardware and/or software within user device (200). In one or more embodiments, the components are described in more detail below, and the functionality of the components are described in connection with FIG. 3.

In one or more embodiments, a device processor (202) directs and controls the components of user device (200) and carries out the functionality described below in connection with FIG. 3. In one or more embodiments, a device processor (202) is operatively connected to and may control the components within the user device (200) (e.g., device storage (204), contact list (206), network interface (208), output module (210), and input module (212)). In one or more embodiments, the device processor (202) may be configured to communicate with a matching server (102) and/or a data repository (104) via the network interface (208). In one or more embodiments of the invention, the device processor (202) includes one or more aspects of the functionality of the computer processor(s) (602) of FIG. 6.

In one or more embodiments, device storage (204) is any type of storage unit and/or device (e.g., a file system, database, collection of tables, or any other storage mechanism) for storing and retrieving data on the user device (200). In one or more embodiments, the device storage (204) is operatively connected, either directly or indirectly, to the device processor (202), network interface (208), the output module (210), and the input module (212) for storage and retrieval of data on the user device (200). In one or more embodiments, the device storage (204) includes functionality to store, in whole or in part, temporarily or permanently, at least a contact list (206).

In one or more embodiments, a contact list (206) is one or more data structures of virtually any type used to store, organize, and/or retrieve personally identifiable information of one or more persons (i.e., "contacts"). For example, a contact list (206) may be used to store personally identifiable information of the friends, family, and/or business associates of a user, and may be accessed by the user to look up the personally identifiable information of one or more persons to communicate with or identify those persons. Such personally identifiable information may include without limitation: first name, middle name, last name, social security number, student ID number, company name, mobile phone number, home phone number, personal email address, work email address, website profile universal resource locator (URL) link, physical address, mailing address, permanent address, instant messenger account ID, social network account ID, device ID, IP address, MAC address, mobile application store ID, etc.

In one or more embodiments, the network interface (208) is a process or group of processes configured to interact with the matching server (102) and/or the data repository (104) via a network (116). Specifically, the network interface (208) may be configured to transmit a contact list (206) to a matching server (102) and receive one or more promoter contacts from the matching server (102). In one or more embodiments, the network interface (208) may be configured to transmit a message to other users of the software application. For example, if a user within the contact list is determined to be a promoter contact, the network interface (208) may be configured to send the user a message related to the software application, features of the software application, or questions related to different versions of the software application. In one or more embodiments, the network interface (208) is controlled by the device processor (202).

Figure 6:
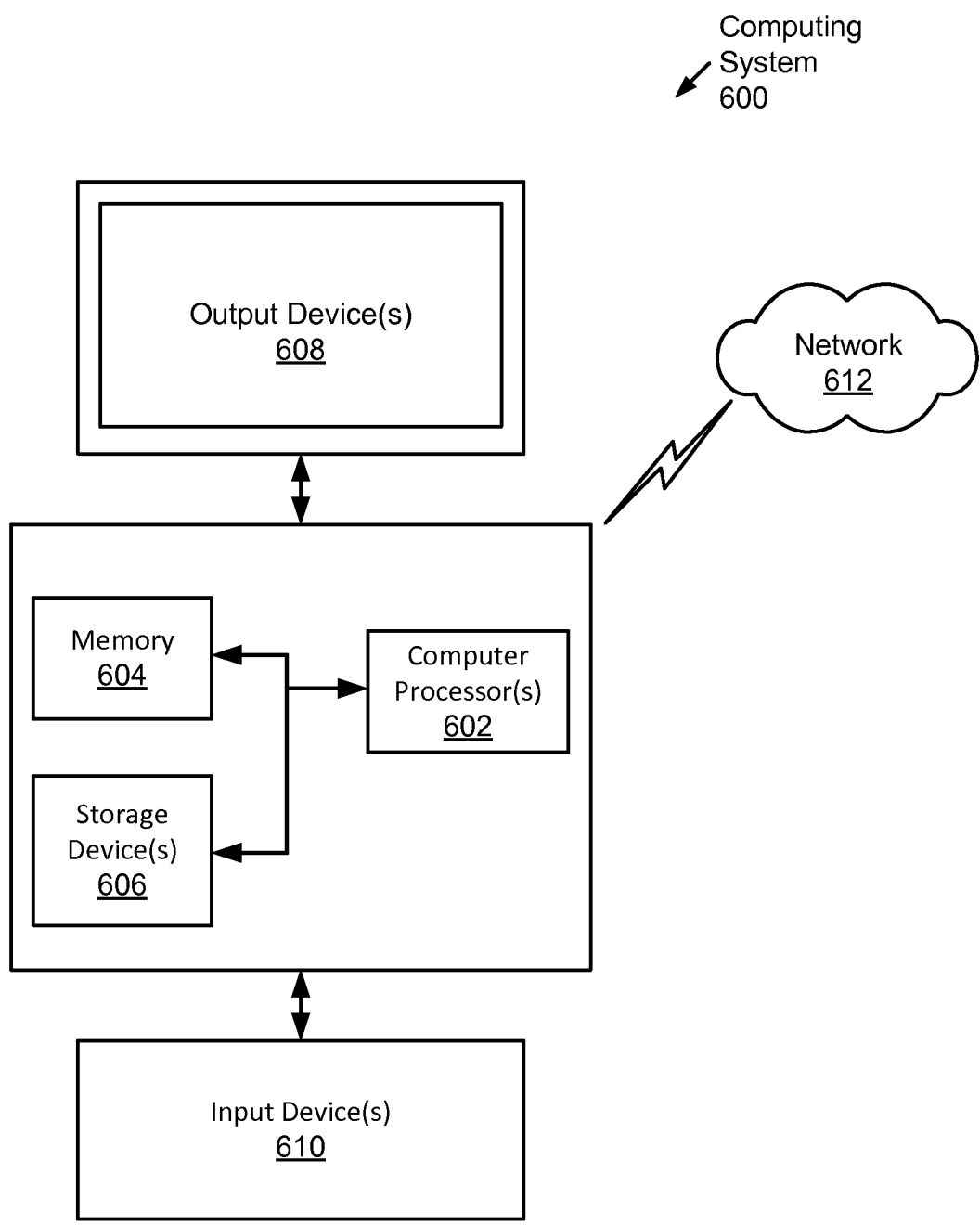
FIG. 6 shows a computing device in accordance with one or more embodiments of the invention.

In one or more embodiments, an output module (210) is a combination of hardware and/or software used to display information to a user of a user device (200) via one or more output devices (e.g., the output device (608) described below in connection with FIG. 6). For example, an output module (210) may be a display driver for a monitor or a touchscreen configured to display information to a user. In one or more embodiments, an output module may be configured to display one or more promoter contacts to a user of a software application.

In one or more embodiments, an input module (212) is a combination of hardware and/or software used to receive information from a user of a user device (200) via one or more input devices (e.g., the input device (610) described below in connection with FIG. 6). For example, an input module (212) may be a keyboard driver, a mouse driver, or a touchscreen driver configured to receive information from a user. In one or more embodiments, an input module may be configured to allow a user to select a promoter contact as a selected promoter contact and to enter a message to send to the selected promoter contact.

While FIGS. 1 and 2 show a configuration of components, other configurations may be used without departing from the scope of the invention. For example, various components may be combined to create a single component. As another example, the functionality performed by a single component may be performed by two or more components. By way of an example, the software application and/or contact list (206) may be remotely stored from the user device (200) and the user device (200) may be configured to access the contact list (206). By way of another example, the survey information (108), review information (110) and usage information (112) may be stored on separate servers and the matching server (102) may be configured to access the separate servers.

Figure 3:
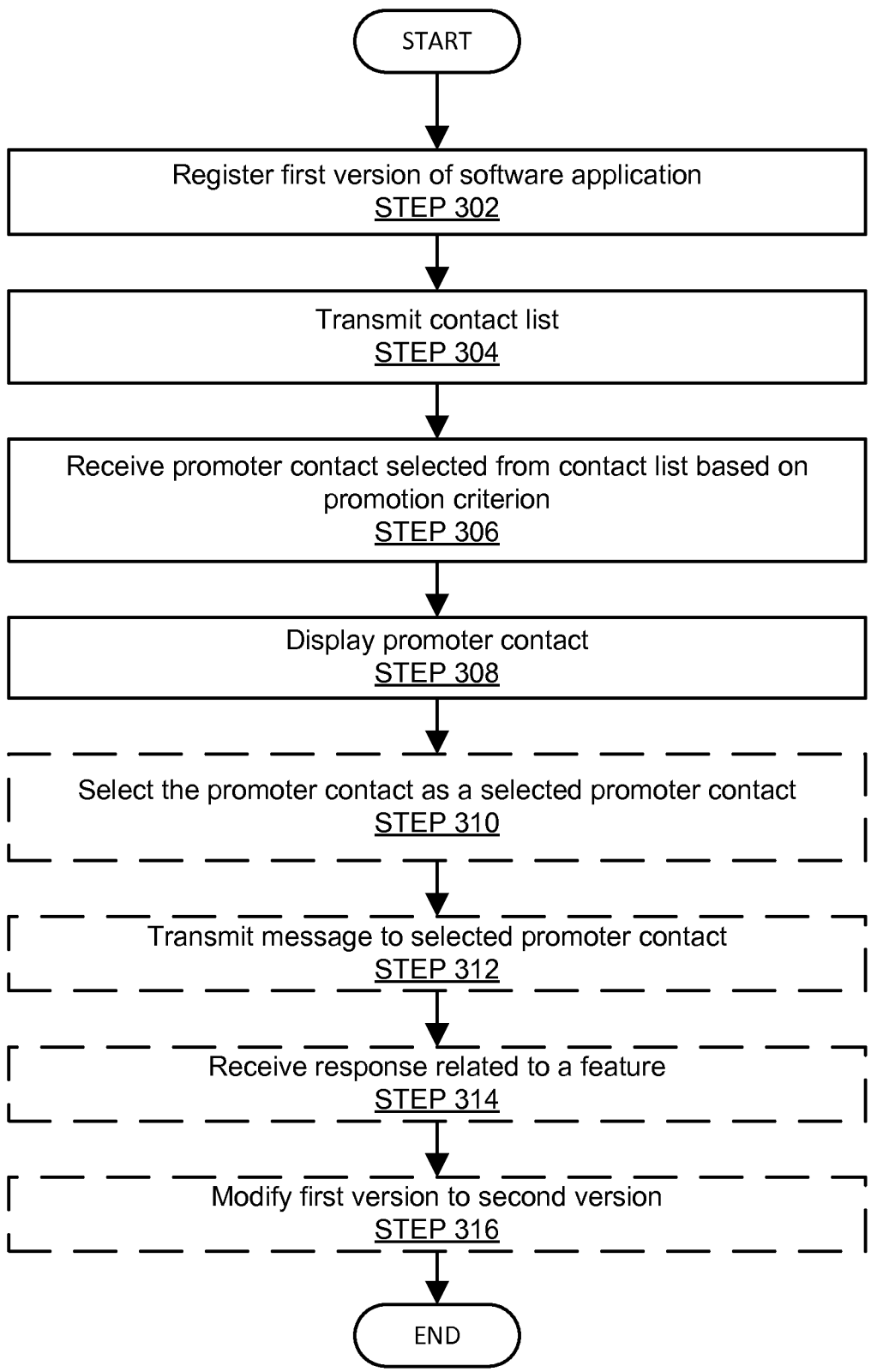
FIGS. 3 and 4 show flowcharts in accordance with one or more embodiments of the invention.

FIG. 3 shows a flowchart in accordance with one or more embodiments for connecting users of a software application. In STEP 302, in one or more embodiments, a first version of a software application is registered. In one or more embodiments, a device processor registers the first version of the software application. For example, the device processor may register the first version of the software application via a network interface of a user device.

In one or more embodiments, registering a version of a software application may include downloading and installing a software application onto a user device. For example, a user may search for, download, and install a software application from a mobile application store onto a mobile device. In some embodiments, registering a version of a software application may include transmission of one or more network messages by the software application after the user runs a software application on a network-connected computer device. For example, upon opening a software application for the first time on a mobile phone or a network-connected personal computer, a version of the software application may be registered by the software application sending a message via a network to a remote server associated with the software application. In one or more embodiments, registering a software application may include user submission of a registration form for the software application. For example, the user may fill in an electronic registration form in response to a prompt which is then submitted via a network to a remote server associated with the software application.

In STEP 304, in one or more embodiments, a contact list is transmitted to a matching server. In one or more embodiments, the contact list includes personally identifiable information of at least one user of the software application. In one or more embodiments, the device processor transmits the contact list. For example, the device processor may transmit the contact information stored on a mobile phone to a matching server via the network interface of the mobile phone.

In one or more embodiments, the device processor retrieves that contact list from the device storage and transmits the contact list to a matching server using a network interface. In other embodiments, the device processor may provide a token, authentication credentials, and/or another access key to a web storage location of the contact list. In one or more embodiments, the contact list, when transmitted, includes personally identifiable information for one or more contacts, which represent one or more persons for which the user has personally identifiable information. In one or more embodiments, the contact list includes one or more contacts, with each contact including personally identifiable information of one person. For example, a contact list, when transmitted, may include a name, phone number, and email address for three contacts, each of which represent people for which the user has personally identifiable information (e.g., ("Bob Smith", "512-555-1268", "bob_smith@abcd.xyz"), ("Dan Jones", "512-555-9876", "dan_jones@abcd.xyz"), and ("Ed Brown", "512-555-4567", "ed_brown@abcd.xyz")). In one or more embodiments, some, all, one, or none of the contacts included in the contact list represent users of the software application. For example, in the example above, "Bob Smith" and "Ed Brown" are users of the software application.

In STEP 306, in one or more embodiments, a promoter contact is received from the matching server. In one or more embodiments, the promoter contact is selected according to a promotion criterion from the users of the software application. For example, the promoter contact may include ("Bob Smith", "512-555-1268", "bob_smith@abcd.xyz"). The selection is discussed further below in connection with STEP 406 and STEP 408. In one or more embodiments, the device processor receives the promoter contact from the matching server via the network interface of the user device. In one or more embodiments, more than one promoter contact may be received from the matching server. For example, if two contacts included in the contact list are determined to be promoter contacts, those two contacts may be received as promoter contacts.

In STEP 308, in one or more embodiments, the promoter contact is displayed. In one or more embodiments, the device processor displays the promoter contact via the output module of the user device. Such display may include use of one or more output devices operatively connected to the user device. In one or more embodiments, the device processor displays the promoter contact on the display screen of a mobile phone or personal computer. For example, the device processor may display the contact of "Bob Smith" via the output module and an output device within a dedicated window or friend list of the software application. In one or more embodiments, if more than one promoter contact is received, some or all of the promoter contacts may be displayed. In one or more embodiments, more than one promoter contact may be received in a relative order, such that the received promoter contacts can be arranged in an order on a display. For example, if ten promoter contacts were received, the first five promoter contacts may be displayed within the software application.

In optional STEP 310, in one or more embodiments, a promoter contact is selected as a selected promoter contact. For example, a user may select a promoter contact as a particularly trusted, knowledgeable person, and/or close relation with whom to communicate. In one or more embodiments, the promoter contact is selected by the device processor in response to user input received through the input module of the user device. For example, after viewing the promoter contact via an output device, a user may select the promoter contact via an input device. In this example, if "Bob Smith" is presented from within the software application, the user may select "Bob Smith" with a mouse, keyboard, touchscreen, etc. In one or more embodiments, more than one promoter contact may be selected as a selected promoter contact. For example, a user may select more than one promoter contact via an input device, after which the device processor selects the promoter contacts indicated by the user as selected promoter contacts. In one or more embodiments, if more than one promoter contact is displayed in STEP 308, fewer than all promoter contacts may be selected as selected promoter contacts. For example, if three promoter contacts are displayed, two promoter contacts may be selected as selected promoter contacts.

In optional STEP 312, in one or more embodiments, a message is transmitted to the selected promoter contact. In one or more embodiments, the message is transmitted to the selected promoter contact by the device processor via the network interface. In one or more embodiments, a message may be related to a first version of the software application or a second version of the software application. For example, a message may include a request for information from a selected promoter contact regarding a second version of a software application as compared to a first version of a software application. In one or more embodiments, a message may be related to a feature of the software application. For example, the user may send a question about a specific feature to a promoter contact. A message may also include a request for assistance from a promoter contact. In one or more embodiments, the contents of a message may include content entered by a user via one or more input devices and/or the input module. For example, the user may type a question into a virtual keyboard of a touchscreen of a mobile phone, which is then transmitted. In one or more embodiments, a message may also include information about the user and the software application. For example, the message may include a screenshot of the software application or state information concerning the user's interaction with the software application.

In one or more embodiments, the message is transmitted via network interface over the network to a selected promoter contact. In one or more embodiments, when more than one selected promoter contact has been selected, the device processor transmits a message to all selected promoter contacts. In one or more embodiments, the message is transmitted using the personally identifiable information associated with the selected promoter contact. For example, if "Bob Smith" was the selected promoter contact, the message may be sent to "Bob Smith" via an simple messaging service (SMS) message to "512-555-1268" or via email to "bob_smith@abcd.xyz."

In optional STEP 314, in one or more embodiments, a response is received from the selected promoter contact related to the feature of the software application as contained in the message. For example, the response may include information related to the software application, to a feature of the software application, or to a question asked by the user. In another example, the response may include information recommending a second version of the software application. In another example, the response may include information comparing a second version of the software application to a first version of the software application. In one or more embodiments, the message is received by the device processor via the network interface of the user device.

In optional STEP 316, in one or more embodiments, the first version of the software application is modified to a second version of the software application. For example, after trying out a lite version of the software application and communicating with a selected promoter contact, a user may choose to upgrade to a paid and fully-featured version of the software application. In one or more embodiments, the device processor modifies the first version of the software application in response to user input received via the input module and/or one or more input devices. For example, the user may have selected a software button marked "Upgrade" within the software application.

In one or more embodiments, a first version of a software application may be modified via replacement with a second version of the software application, adding and/or removing features of the software application, locking and/or unlocking features of the software application, adding and/or removing advertising from the software application, and/or extending a set amount of usage time or application openings for the software application by the user, etc. For example, a first version of a software application may be uninstalled, and a second version of the software application may be installed. In another example, the user may input a code into a first version of the software application, unlocking one or more features of the software application and modifying the first version of the software application into a second version of the software application. In another example, a limit on the number of times a user may use a software application is removed, modifying it into a second version of the software application. In another example, the advertising may be removed from a first version of the software application, modifying it into a second version of the software application. The modification may happen with or without involvement of the user, such as by entering a code, selecting the second version of the program to download and install, selecting an "upgrade" option within the program, or similar.

Figure 4:
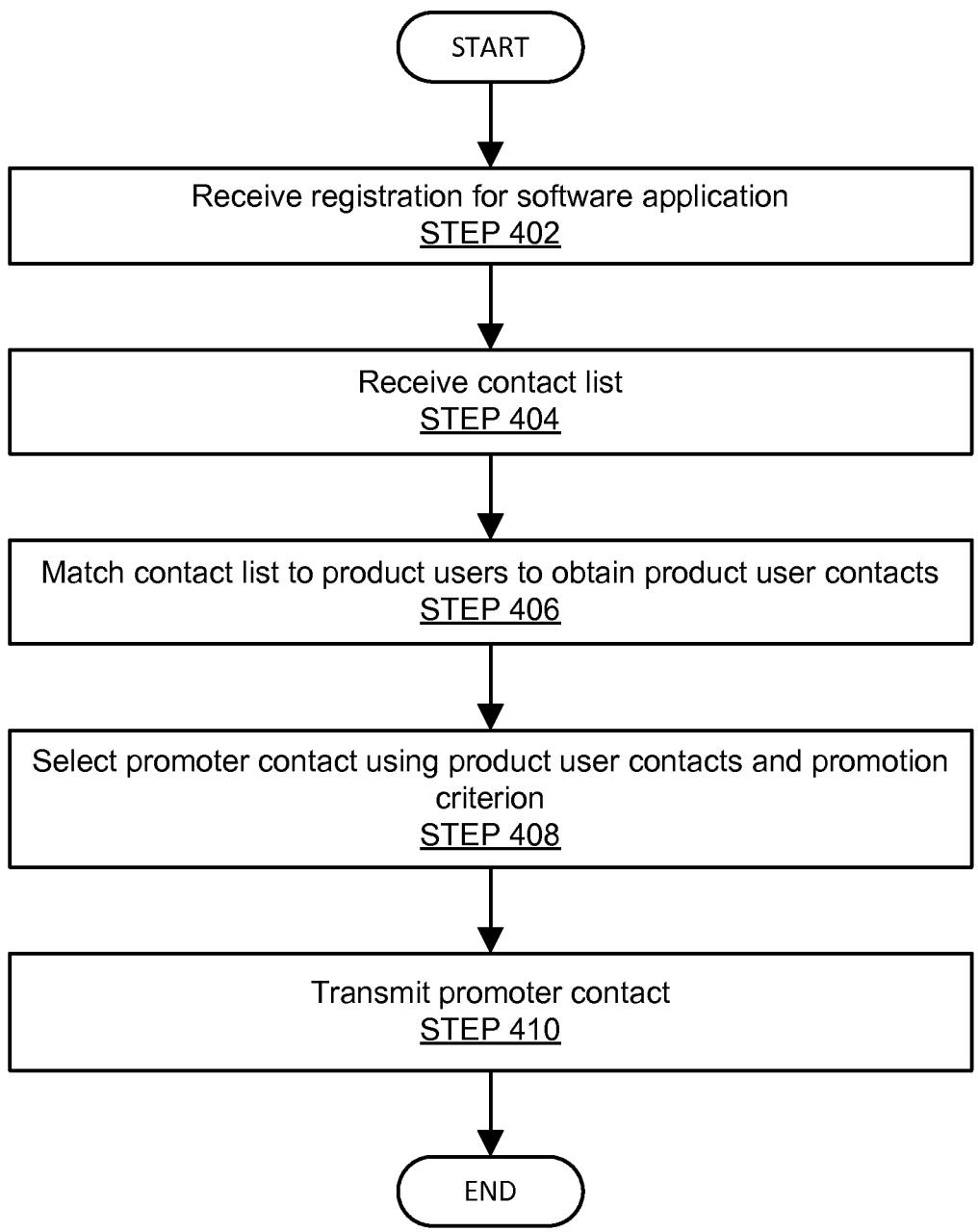

FIG. 4 shows a flowchart in accordance with one or more embodiments for connecting users of a software application. In STEP 402, in one or more embodiments, a registration for the software application is received. In one or more embodiments, the matching server receives the registration for the software application. In one or more embodiments, a registration for the software application is one or more messages received from the computer executing the software application after the user runs the software application for the first time. For example, upon opening a software application for the first time on a mobile phone or a network-connected personal computer, the software application may send a message via a network to the matching server. In one or more embodiments, receiving a registration for the software application may include receiving a user submission of a registration form for the software application. For example, the user may fill in a registration form in response to a prompt which is then submitted via a network to the matching server.

In STEP 404, in one or more embodiments, a contact list is received from a user device. In one or more embodiments, the matching server receives the contact list. In one or more embodiments, the registration received in STEP 402 and the contact list received in STEP 404 may be received in a single message or transmission. In one or more alternative embodiments, the registration received in STEP 402 and the contact list received in STEP 404 may be received in a separate messages or transmissions.

In STEP 406, in one or more embodiments, the contact list is matched to one or more product users of the software application to obtain one or more product user contacts. In one or more embodiments, the matching server matches the contact list. In one or more embodiments, the matching server compares some or all of the personally identifiable information for each contact within the contact list against one or more user application profiles (e.g., survey information, review information, and/or usage information) stored on a data repository. For example, the matching server may attempt to match each contact included in the contact list with the survey information, the review information, and/or the usage information stored on a data repository. Successful matching (e.g., the data repository includes survey information, review information, or usage information for the contact) results in that contact becoming one of the product users contacts. In one or more embodiments, the product user contacts may also include users that have registered a version of the software application.

In STEP 408, in one or more embodiments, a promoter contact is selected from the one or more product user contacts based on a promotion criterion. In one or more embodiments, the matching server selects the promoter contact based on the promotion criterion and on the user application profile for the software application. For example, the matching server may iterate through each product user contact. In one or more embodiments, for each product user contact, the matching server may retrieve user application profile information for the product user contact for the software application. For example, the matching server may retrieve any survey information, review information, and usage information for each product user contact for the software application. In one or more embodiments, the matching server compares the user application profile information for each product user contact against the promotion criterion for the software application.

In one or more embodiments, the data repository includes the promotion criterion and the user application profile. In one or more embodiments, some or all of the promotion criterion and/or user application profile is stored on the matching server. In one or more alternative embodiments, some or all of the promotion criterion and/or user application profile is stored on a remotely accessible server operatively connected to the matching server via the network.

In one or more embodiments, the selection is made using survey information. For example, a contact from one or more of the product user contacts is selected as a promoter contact when survey information shows that the user represented by the contact has indicated a measure of user satisfaction or user engagement with the software application or with features within the software application that meets or exceeds the promotion criterion for the software application. In one or more embodiments, the selection includes a comparison of the survey information with the promotion criterion (i.e., a minimal level of user satisfaction and/or user engagement indicating that a user is a promoter contact of a software application).

For example, a first contact within the product user contacts may have survey information for the software application wherein the user represented by the first contact has indicated high satisfaction with the software application. In this example, the promotion criterion requires a medium level of satisfaction or higher for a user to be selected as a promoter contact. In this example, the first contact is selected as a promoter contact. In this example, the first contact may have survey information representing a value of "10" in response to a question of "How satisfied are you with the program on a scale of 1-10?"

In another example, a second contact within the one or more product user contacts may have survey information for the software application wherein the user represented by the second contact has indicated high user engagement with the software application. In this example, the promotion criterion requires an 7 or higher for a user to be selected as a promoter contact. In this example, the second contact may have survey information representing a value of "8" in response to a question of "How likely are you to use the application again on a scale of 1-10?" indicating that the second contact may be selected as a promoter contact.

In one or more embodiments, the selection is made using review information. For example, a contact from the one or more product user contacts is selected as a promoter contact when review information shows that the user represented by the contact has indicated a measure of user satisfaction or user engagement with the software application or with features within the software application that meets or exceeds the promotion criterion.

For example, a third contact within the one or more product user contacts may have review information for the software application wherein the user represented by the third contact has indicated high satisfaction with the software application. In this example, the promotion criterion includes a minimal satisfaction rating of medium or higher to select a user as a promoter contact. In this example, the third contact is selected as a promoter contact. In this example, the third contact may have review information representing a value of "5 stars" in response to a question of "How would you rate the program?", and the promotion criterion includes a minimal review score of "4 stars" or higher to select a contact as a promoter contact.

In another example, a fourth contact within the one or more product user contacts may have review information for the software application wherein the user represented by the fourth contact has indicated high user engagement with the software application. In this example, with a promotion criterion of 6 or higher to be selected as a promoter contact, the fourth contact may have review information representing a value of "9" in response to a question of "How would you rate the social features of the application?" and therefore be selected as a promoter contact.

In one or more embodiments, the selection is made using usage information. For example, a contact from the one or more product user contacts is selected as a promoter contact when usage information shows that the user represented by the contact has indicated a high measure of user satisfaction or user engagement with the software application or with features within the software application. In this example, the promotion criterion includes a medium level of user satisfaction or user engagement to select a user as a promoter contact.

For example, a fifth contact within the one or more product user contacts may have usage information for the software application wherein the user represented by the fifth contact has indicated high satisfaction with the software application, resulting in the selection of the fifth contact as a promoter contact. In this example, the fifth contact may have usage information showing that the fifth contact has used the software application more than five times. If the promotion criterion includes a minimal level of five openings of the software application to select a contact as a promoter contact, the fifth user is selected as a promoter contact.

In another example, a sixth contact within the one or more product user contacts may have usage information for the software application wherein the user represented by the sixth contact has indicated high user engagement with the software application. In this example, the sixth contact may have usage information showing that the sixth contact has used the software application on average twice daily for the past two weeks. If the promotion criterion includes a minimal level of average daily use of once per day for the previous week, the sixth contact is selected as a promoter contact.

In one or more embodiments, a promotion criterion for a software application includes a mixture of minimal requirements for survey information, review information, and usage information, some or all of which may be weighted, optional, or in the alternative. For example, a promotion criterion for a software application may include survey information of 7 or higher and a usage information of 15 or more software openings to select a user as a promoter contact. The same promotion criterion may include survey information of 9 or higher with no additional usage information requirement to select a user as a promoter contact. In this example, if either condition is met, a user is selected as a promoter contact. In this example, a seventh contact may have usage information showing that the seventh contact has only opened the software three times, yet has survey information including a rating of 10 for the software application. In this example, the seventh user is selected as a promoter contact.

In one or more embodiments, a contact from the user contacts included in the contact list is not selected as a promoter contact where user application profile information is not present for the contact for the software application or shows that the user represented by the contact has not met the promotion criterion. For example, a user represented by a seventh contact may have survey information for the software application representing a value of "2" in response to a question of "How satisfied are you with the program on a scale of 1-10?", resulting in the seventh contact not being included in the promoter contacts where the promotion criterion includes a minimal response of "5" to select a contact as a promoter contact. In another example, an eighth contact may have usage information showing that the eighth contact has used the software application only once and not in the past year, resulting in the eighth contact not being selected as a promoter contact where the promotion criterion includes a minimal level of average daily use of once per day for the previous week.

In one or more embodiments, a contact included in the contact list is not selected as a promoter contact if the user application profile information for the contact does not match any promotion criterion for the software application. For example, if the user application profile contains review information for a user, however the promotion criterion includes a minimal usage information for a contact to be selected as a promoter contact with no minimal review information score, the contact may not be selected as a promoter contact.

In one or more embodiments, more than one promoter contact may be selected from the one or more product user contacts. For example, if two contacts within the product user contacts have user application profile information that meets or exceeds the promotion criterion associated with the software application, then the two contacts may be selected as promoter contacts.

In STEP 410, in one or more embodiments, the promoter contact is transmitted to the user device. In one or more embodiments, the matching server transmits the promoter contact using the network. In one or more embodiments, if more than one contact was selected as a promoter contact in STEP 408, more than one promoter contact may be transmitted to the user device.

While the various steps in the flowcharts in FIGS. 3 and 4 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt-driven in accordance with one or more embodiments. By way of an example, determination and/or selection steps may not require a processor to process an instruction unless an interrupt is received to signify that condition exists in accordance with one or more embodiments. As another example, determination and/or steps may be performed by performing a test, such as checking a data value to test whether the value is consistent with the tested condition in accordance with one or more embodiments.

Figure 5:
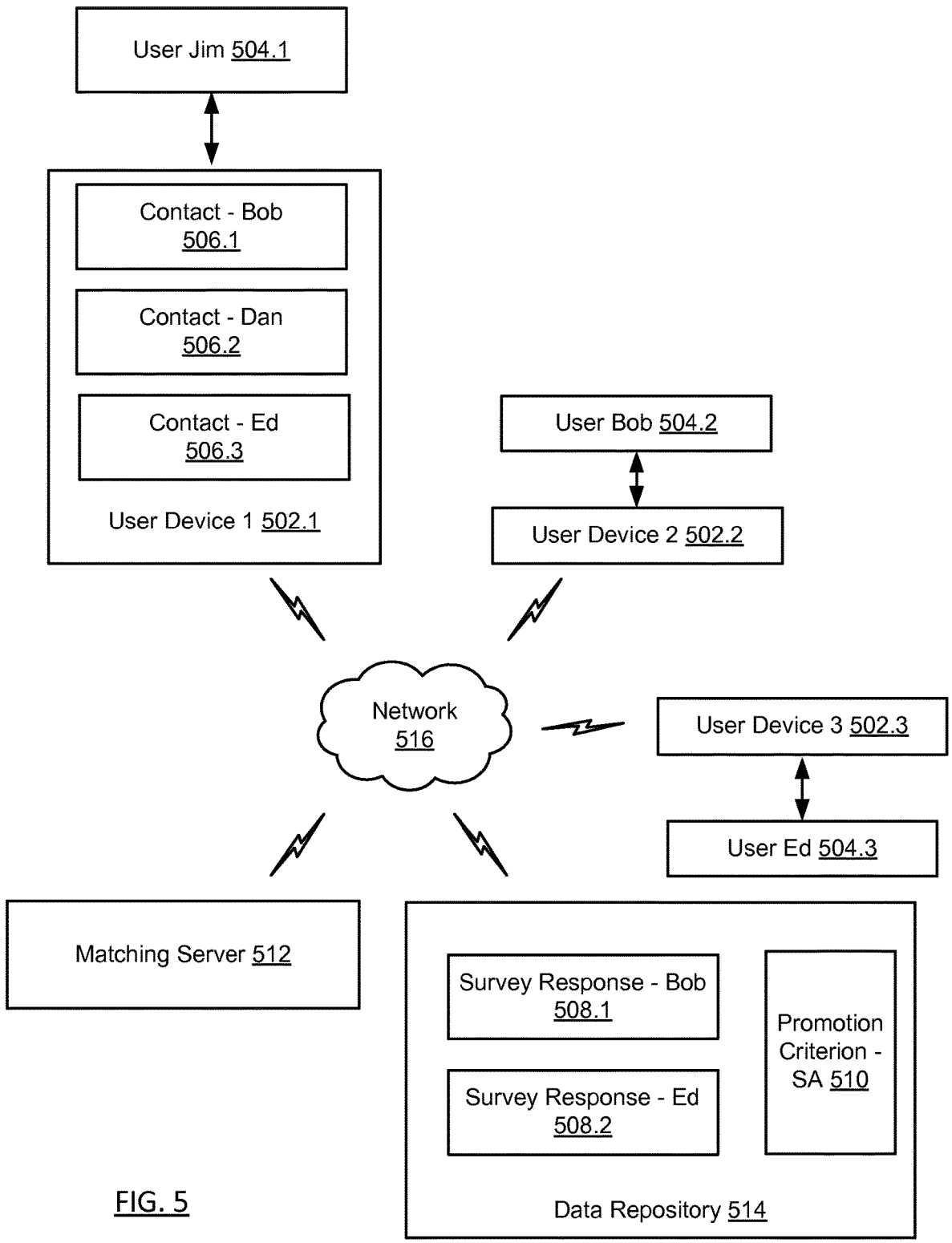
FIG. 5 shows an example in accordance with one or more embodiments of the invention.

FIG. 5 shows an example in accordance with one or more embodiments of the invention. The following example is for explanatory purposes only and not intended to limit the scope of the invention. In FIG. 5, user Jim (504.1) has user device 1 (502.1), which includes a contact list with one or more contacts (e.g., Contact-Bob (506.1), Contact-Dan (506.2), and Contact-Ed (506.3)). User Bob (504.2) has user device 2 (502.2). User Ed (504.3) has user device 3 (502.3). The user devices (e.g., user device 1 (502.1), user device 2 (502.2), and user device 3 (502.3)) may be one or more specialized computer systems as described below in connection with FIG. 6. The user devices (e.g., user device 1 (502.1), user device 2 (502.2), and user device 3 (502.3)) are connected to each other and to matching server (512) and a data repository (514) via network (516). Data repository (514) includes a user application profile for software application SA with two pieces of survey information (e.g., survey response—Bob (508.1) and survey response—Ed (508.2)). Data repository (514) also includes promotion criterion SA (510) for software application SA. All or parts of the data repository (514) may be located on the same computer or computers as the matching server (512), or may be remotely connected to the matching server (512) via the network (516).

The matching server (512) is one non-limiting example of the matching server (102) of FIG. 1. The data repository (514) is one non-limiting example of the data repository (104) of FIG. 1. The network (516) is one non-limiting example of the network (116) of FIG. 1.

The contacts (e.g., contact-Bob (506.1), contact-Dan (506.2), and contact-Ed (506.3)) include personally identifiable information for user Bob (504.2), Dan, and user Ed (504.3), respectively, as stored on user device 1 (502.1). For example, the contacts (e.g., contact-Bob (506.1), contact-Dan (506.2), and contact-Ed (506.3)) may include a name, phone number, and email address for each person represented by the contact. In this example, contact-Bob (506.1) includes ("Bob Smith", "512-555-1268", "bob_smith@abcd.xyz"). Further in this example, contact-Dan (506.2) includes ("Dan Jones", "512-555-9876", "dan_jones@abcd.xyz"). Further in this example, contact-Ed (506.3) includes ("Ed Brown", "512-555-4567", "ed_brown@abcd.xyz").

In one or more embodiments, data repository (514) includes a user application profile for software application SA with two pieces of survey information (e.g., survey response—Bob (508.1) and survey response—Ed (508.2)). In this example, each piece of survey information includes responses that user Bob (504.2) and user Ed (504.3) have entered in response to questions related to software application SA. For example, survey response—Bob (508.1) includes an overall application score of 10 for software application SA on a scale of 1-10, with 10 being the highest. Further in this example, survey response—Ed (508.2) includes an overall application score of 4 for software application SA on a scale of 1-10, with 10 being the highest.

In this example, user Jim (504.1) registers a first lite version of software application SA via the device processor executing on user device 1 (502.1). The device processor executing on user device 1 (502.1) transmits a contact list to the matching server (512), wherein the contact list includes the contacts stored on user device 1 (502.1) (e.g., contact-Bob (506.1), contact-Dan (506.2), and contact-Ed (506.3)). The contact list includes personally identifiable information for each person represented by each contact (e.g., ("Bob Smith", "512-555-1268", "bob_smith@abcd.xyz"), ("Dan Jones", "512-555-9876", "dan_jones@abcd.xyz"), and ("Ed Brown", "512-555-4567", "ed_brown@abcd.xyz")).

In this example, the matching server (512) receives the registration for the software application SA from user device 1 (502.1). The matching server (512) also receives the contact list from user device 1 (502.1), and matches the contact list received from user device 1 (502.1) to one or more product users of the software application SA to obtain one or more product user contacts. In this example, the matching server (512) compares the contacts in the contact list (e.g., contact-Bob (506.1), contact-Dan (506.2), and contact-Ed (506.3)) against the user application profile for software application SA (e.g., survey response—Bob (508.1) and survey response—Ed (508.2)) stored in the data repository (514). A match is found twice: first between the personally identifiable information for contact-Bob (506.1) and survey response—Bob (508.1), and second between the personally identifiable information for contact-Ed (506.3) and survey response—Ed (508.2). No match is found for contact-Dan (506.2). Contact-Bob (506.1) and Contact-Ed (506.3) are then included in the product user contacts.

In this example, the matching server (512) selects a promoter contact from the product user contacts based on promotion criterion—SA (510) and the user application profile for software application SA (e.g., survey response—Bob (508.1) and survey response—Ed (508.2)). Further in this example, the matching server (512) determines the survey response—Bob (508.1) (i.e., a survey response of "10" for overall satisfaction with software application SA) and compares it to promotion criterion—SA (510) (i.e., a minimal survey response of "7" or greater for overall satisfaction with software application SA). Contact-Bob (506.1) is therefore selected as a promoter contact. Additionally in this example, the matching server (512) examines the survey response—Ed (508.2) (e.g., a survey response of "4" for overall satisfaction with software application SA) and compares it to promotion criterion—SA (510) (i.e., a minimal survey response of "7" or greater for overall satisfaction with software application SA). In this example, survey response—Ed (508.2) does not meet or exceed promotion criterion—SA (510), and therefore contact-Ed (506.3) is not selected as a promoter contact.

In this example, the promoter contact (e.g., Contact-Bob (506.1)) is transmitted via network (516) to user device 1 (502.1), is received at user device 1 (502.1), and is displayed on an output device connected to user device 1 (502.1). In this example, a window within software application SA executing on user device 1 (502.1) displays the name, phone number, and email address as contained in contact-Bob (506.1) for user Bob (504.2). When user Bob (504.2) has his contact information displayed, user Jim (504.1) may recognize user Bob (504.2) as a trusted friend whose opinion related to software is valued by user Jim (504.1) and easy for user Jim (504.1) to understand. User Jim (504.1) may then select the name of user Bob (504.2) via the touchscreen of user device 1 (502.1), making the contact associated with user Bob (504.2), contact-Bob (506.1), a selected promoter contact. User Jim (504.1) may enter a message to user Bob (504.2) via an input device connected to user device 1 (502.1). The message may include a question on how satisfied user Bob (504.2) is with a second version of software application SA, or about a specific feature within software application SA. The message is then transmitted to user Bob (504.2), who may send back a response to user Jim (504.1).

In this example, the response that is sent to user Jim (504.1) may include feedback for user Jim (504.1) related to the software application SA, or may include advice guiding user Jim (504.1) through use of the software application SA. The response may be of value to user Jim (504.1) in that user Jim (504.1) is communicating with someone he knows and trusts and who speaks the same language as user Jim (504.1).

In this example, user Jim (504.1) may then modify his version of software application SA from a lite version to a paid and more fully featured version. For example, upon receiving a response from user Bob (504.2) that the paid version of software application SA is worth the money, user Jim (504.1) may choose to upgrade to the paid version. In this example, user Jim (504.1) may select an "Upgrade Now" option within software application SA and tender payment within software application SA, after which the lite version is modified to a second, paid version of software application SA. In this example, additional features are unlocked within software application SA.

In another example, user Jim (504.1) may increase his engagement with software application SA upon receipt of the message from user Bob (504.2). For example, user Jim (504.1), now encouraged by user Bob (504.2), may now use software application SA more frequently than prior to contact with user Bob (504.2).

Embodiments may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments.

Further, one or more elements of the aforementioned computing system (600) may be located at a remote location and connected to the other elements over a network (612). Further, embodiments may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:

transmitting, during a registration process that comprises downloading a lite version of a software application on a user device, a contact list of a user from the user device to a matching server, wherein the matching server identifies, within the contact list from the user device, a plurality of existing users of a fully-featured version of the software application and selects a promoter contact from the plurality of existing users within the contact list based on promotion criteria, and wherein the promotion criteria comprise:

a minimal score on a survey completed by the promoter contact regarding overall satisfaction with the software application, and a minimal number of times that the promoter contact has opened the software application, wherein the minimal number of times is determined by automatically tracking a number of times that the promoter contact has opened the software application;

receiving automatically, by the user device and from the matching server, the promoter contact selected by the matching server;

displaying, automatically, the promoter contact within a window of the lite version of the software application executing on the user device;

transmitting, after displaying the promoter contact, a message generated by the user and related to a feature of the software application from the user device to the promoter contact;

receiving, by the user device, a response to the message from the promoter contact;

receiving, by the user device after receiving the response to the message, a user selection of a software button displayed in a graphical user interface of the user device; and upgrading automatically, by the user device and in response to the user selection of the software button, the lite version of the software application on the user device to the fully-featured version of the software application.

2. The method of claim 1, wherein the promotion criteria further comprise one or more measures of user engagement with the software application.

3. The method of claim 1, wherein the promotion criteria further comprise a plurality of reviews from the users of the software application.

4. The method of claim 1, wherein the promotion criteria further comprise a plurality of usage statistics from the users of the software application.

5. A method, comprising:

receiving, by a matching server and from a user device, a contact list of a user during a registration process that comprises the user device downloading a lite version of a software application;

identifying automatically, by the matching server, a plurality of existing users of a full-featured version of the software application within the contact list;

selecting automatically, by the matching server, a promoter contact from the plurality of existing users within the contact list based on promotion criteria, wherein the promotion criteria comprise:

a minimal score on a survey completed by the promoter contact regarding overall satisfaction with the software application, and a minimal number of times that the promoter contact has opened the software application, wherein the minimal number of times is determined by automatically tracking a number of times that the promoter contact has opened the software application; and transmitting, by the matching server, the promoter contact to the user device, wherein the user device displays the promoter contact within a window of the lite version of the software application executing on the user device, wherein the user device receives, after display of the promoter contact, a user selection of a software button displayed in a graphical user interface of the user device, and wherein the user device automatically upgrades the software application on the user device from the lite version to the fully-featured version in response to the user selection of the software button.

6. The method of claim 5, wherein the promotion criteria further comprise a plurality of reviews from the users of the software application.

7. The method of claim 5, wherein the promotion criteria further comprise a plurality of usage statistics from the users of the software application.

8. A system, comprising:

a matching server configured to:

receive a contact list over a network, identify, automatically, a plurality of existing users of a fully-featured version of a software application within the contact list, select, automatically, a promoter contact from the plurality of existing users based on promotion criteria, wherein the promotion criteria comprise:

a minimal score on a survey completed by the promoter contact regarding overall satisfaction with the software application, and a minimal number of times that the promoter contact has opened the software application, wherein the minimal number is determined by automatically tracking a number of times that the promoter contact has opened the software application, and transmit, automatically, the promoter contact over the network; and a user device configured to:

transmit automatically, to the matching server and over the network, the contact list of a user during a registration process that comprises downloading a lite version of the software application on the user device, receive automatically, from the matching server and over the network, the promoter contact selected by the matching server from the plurality of existing users within the contact list, display, automatically, the promoter contact within a window of the lite version of the software application executing on the user device, transmit, after displaying the promoter contact, a message generated by the user and related to a feature of the software application to the promoter contact, receive, a response to the message from the promoter contact, and receive automatically, after receiving the response to the message, a user selection of a software button displayed in a graphical user interface of the user device;

upgrade automatically, in response to the user selection of the software button, the lite version of the software application on the user device to the fully-featured version of the software application.

9. The system of claim 8, wherein the promotion criteria further comprise one or more measures of user engagement with the software application.

10. The system of claim 8, wherein the promotion criteria further comprise a plurality of reviews from the users of the software application.

11. The system of claim 8, wherein the promotion criteria further comprise a plurality of usage statistics from the users of the software application.

12. A non-transitory computer readable medium storing instructions that when executed by a computer processor of a user device, cause the computer processor to:

transmit a contact list of a user from the user device to a matching server during a registration process that comprises downloading a lite version of a software application on the user device, wherein the matching server identifies, within the contact list from the user device, a plurality of existing users of a fully-featured version of the software application and selects a promoter contact from the plurality of existing users within the contact list based on promotion criteria, and wherein the promotion criteria comprise:

a minimal score on a survey completed by the promoter contact regarding overall satisfaction with the software application, and a minimal number of times that the promoter contact has opened the software application, wherein the minimal number of times is determined by automatically tracking a number of times that the promoter contact has opened the software application;

receive automatically, by the user device and from the matching server, the promoter contact selected by the matching server;

display, automatically, the promoter contact within a window of the lite version of the software application executing on the user device;

transmit, after displaying the promoter contact, a message generated by the user and related to a feature of the software application from the user device to the promoter contact;

receive, by the user device, a response to the message from the promoter contact;

receive, by the user device after receiving the response to the message, a user selection of a software button displayed in a graphical user interface of the user device; and upgrade automatically, by the user device and in response to the user selection of the software button, the lite version of the software application on the user device to the fully-featured version of the software application.

\* \* \* \* \*